US011097462B2

(12) United States Patent
McGraw

(10) Patent No.: US 11,097,462 B2
(45) Date of Patent: Aug. 24, 2021

(54) SYSTEM AND METHOD OF MANUFACTURING SUSPENSION SEATING

(71) Applicant: Herman Miller, Inc., Zeeland, MI (US)

(72) Inventor: Ethan McGraw, Holland, MI (US)

(73) Assignee: HERMAN MILLER, INC., Zeeland, MI (US)

( * ) Notice: Subject to any disclaimer, the term of this patent is extended or adjusted under 35 U.S.C. 154(b) by 709 days.

(21) Appl. No.: 15/619,713

(22) Filed: Jun. 12, 2017

(65) Prior Publication Data
US 2017/0355129 A1    Dec. 14, 2017

Related U.S. Application Data

(60) Provisional application No. 62/349,477, filed on Jun. 13, 2016.

(51) Int. Cl.
| | |
|---|---|
| B29C 55/16 | (2006.01) |
| B68G 7/12 | (2006.01) |
| A47C 31/02 | (2006.01) |
| A47C 7/14 | (2006.01) |
| A47C 5/06 | (2006.01) |

(Continued)

(52) U.S. Cl.
CPC .............. *B29C 55/165* (2013.01); *A47C 5/06* (2013.01); *A47C 7/142* (2018.08); *A47C 7/282* (2013.01);
(Continued)

(58) Field of Classification Search
CPC ......... A47C 7/282; A47C 31/023; A47C 5/06; A47C 31/02; A47C 7/14; B65H 23/044;
(Continued)

(56) References Cited

U.S. PATENT DOCUMENTS

| | | |
|---|---|---|
| 2,638,656 A | 5/1953 | Tuttle et al. |
| 3,688,804 A | 9/1972 | Brown et al. |

(Continued)

FOREIGN PATENT DOCUMENTS

| | | |
|---|---|---|
| CN | 100522533 C | 8/2009 |
| EP | 0974949 A1 | 1/2000 |

(Continued)

OTHER PUBLICATIONS

Search Report from the United Kingdom Intellectual Property Office for Application No. GB1709310.5 dated Nov. 15, 2017 (5 pages).

*Primary Examiner* — Timothy Kennedy
*Assistant Examiner* — Alexander A Wang
(74) *Attorney, Agent, or Firm* — Michael Best & Friedrich LLP

(57) ABSTRACT

A method of manufacturing suspension seating includes providing a blank to be used in a suspension member. The blank has a non-visible marker. The method also includes illuminating the non-visible marker with an excitation source. The non-visible marker becomes detectable when illuminated by the excitation source. The method further includes sensing the non-visible marker with a sensor. The sensor is configured to detect the non-visible marker when illuminated by the excitation source. The method also includes determining, by a controller, a characteristic of the blank using the non-visible marker. The controller is in communication with the sensor and configured to receive information related to the non-visible marker from the sensor. The method further includes adjusting the blank to achieve the desired characteristic.

28 Claims, 11 Drawing Sheets

(51) Int. Cl.
*A47C 7/28* (2006.01)
*B29C 45/14* (2006.01)
*G01L 1/24* (2006.01)
*B29C 55/12* (2006.01)
*B29L 31/44* (2006.01)

(52) U.S. Cl.
CPC ............ *A47C 31/02* (2013.01); *A47C 31/023* (2013.01); *B29C 45/14065* (2013.01); *B68G 7/12* (2013.01); *A47C 7/14* (2013.01); *B29C 55/12* (2013.01); *B29C 55/16* (2013.01); *B29L 2031/443* (2013.01); *G01L 1/241* (2013.01)

(58) Field of Classification Search
CPC . B65H 23/02; B29C 55/165; B29C 45/14065; B29C 55/12; B29C 55/16; B68G 7/12; B29L 2031/443; G01L 1/241
See application file for complete search history.

(56) References Cited

U.S. PATENT DOCUMENTS

| | | | |
|---|---|---|---|
| 3,837,890 A | 9/1974 | Sumner et al. | |
| 3,839,637 A | 10/1974 | Willis | |
| 5,573,851 A | 11/1996 | Lengers et al. | |
| 6,125,521 A | 10/2000 | Stumpf et al. | |
| 6,499,513 B1* | 12/2002 | Couch | A41H 3/08 112/470.03 |
| 6,514,609 B1 | 2/2003 | Siggel et al. | |
| 7,409,769 B2 | 8/2008 | Tedesco et al. | |
| 7,677,873 B2 | 3/2010 | Sayers et al. | |
| 8,066,501 B2 | 11/2011 | Sayers et al. | |
| 8,207,511 B2 | 6/2012 | Bortz et al. | |
| 2005/0193574 A1 | 9/2005 | Tedesco et al. | |
| 2006/0255645 A1 | 11/2006 | Coffield et al. | |
| 2007/0116795 A1* | 5/2007 | Sayers | B29C 31/008 425/395 |
| 2012/0253752 A1 | 10/2012 | Brauer | |
| 2018/0120096 A1* | 5/2018 | Kruesi | G01M 5/00 |

FOREIGN PATENT DOCUMENTS

| | | |
|---|---|---|
| EP | 1680265 B1 | 9/2011 |
| WO | 9838365 A1 | 9/1998 |
| WO | 0240765 A2 | 5/2002 |
| WO | 2005046952 A2 | 5/2005 |

\* cited by examiner

SYSTEM AND METHOD OF MANUFACTURING SUSPENSION SEATING

CROSS-REFERENCE TO RELATED APPLICATIONS

This application claims priority to U.S. Provisional Patent Application No. 62/349,477, filed Jun. 13, 2016, the entire contents of which are incorporated by reference herein.

FIELD OF THE INVENTION

Various exemplary embodiments relate to a suspension of a seating structure, and a system and method of manufacturing suspension seating.

BACKGROUND

Some seating structures are configured with a suspension member secured to a frame over an opening. Often, the suspension member is put in tension over the opening. When used as a seat, the suspension member should be able to sustain relatively large loads applied by the user. Typical suspension members have a uniform tension applied along one direction, whether front-to-back or side-to-side. As such, the stiffness of the suspension member when installed in a seating structure may tend to be relatively homogenous.

One example of a seating structure includes office chairs or task chairs. Office chairs are typically configured to allow tilting of the seat and backrest as a unit or tilting of the backrest relative to the seat.

SUMMARY

In one embodiment, the invention provides a method of manufacturing suspension seating. The method includes providing a blank to be used in a suspension member. The blank has a non-visible marker. The method also includes illuminating the non-visible marker with an excitation source. The non-visible marker becomes detectable when illuminated by the excitation source. The method further includes sensing the non-visible marker with a sensor. The sensor is configured to detect the non-visible marker when illuminated by the excitation source. The method also includes determining, by a controller, a characteristic of the blank using the non-visible marker. The controller is in communication with the sensor and configured to receive information related to the non-visible marker from the sensor. The method further includes adjusting the blank to achieve the desired characteristic.

In another embodiment, the invention provides a stretching machine for creating a suspension member from a blank. The blank has a non-visible marker. The stretching machine includes a support frame and a tensioning mechanism movably coupled to the support frame. The tensioning mechanism includes a clamping element configured to grip a portion of the blank and an actuator coupled to the clamping element to move the clamping element. The stretching machine also includes an excitation source directed towards the blank and operable to selectively illuminate the non-visible marker in the blank. The non-visible marker becomes visible when illuminated by the excitation source. The stretching machine further includes a sensor configured to detect the non-visible marker when the non-visible marker is illuminated by the excitation source and a controller in operative communication with the sensor and the tensioning mechanism. The controller is operable to determine a characteristic of the blank based on information received from the sensor related to the non-visible marker, compare the characteristic of the blank to a desired characteristic, and send instructions to the tensioning mechanism to adjust the blank to achieve the desired characteristic.

In yet another embodiment, the invention provides a chair including a seat, a backrest, and a base. In some embodiments, the seat includes a frame, a suspension member having a non-visible marker, and a carrier coupled to the suspension member for connecting the suspension member to the frame. In other embodiments, the backrest includes a frame, a suspension member having a non-visible marker, and a carrier coupled to the suspension member for connecting the suspension member to the frame.

Other aspects of the invention will become apparent by consideration of the detailed description and accompanying drawings.

DETAILED DESCRIPTION

Figure 1:
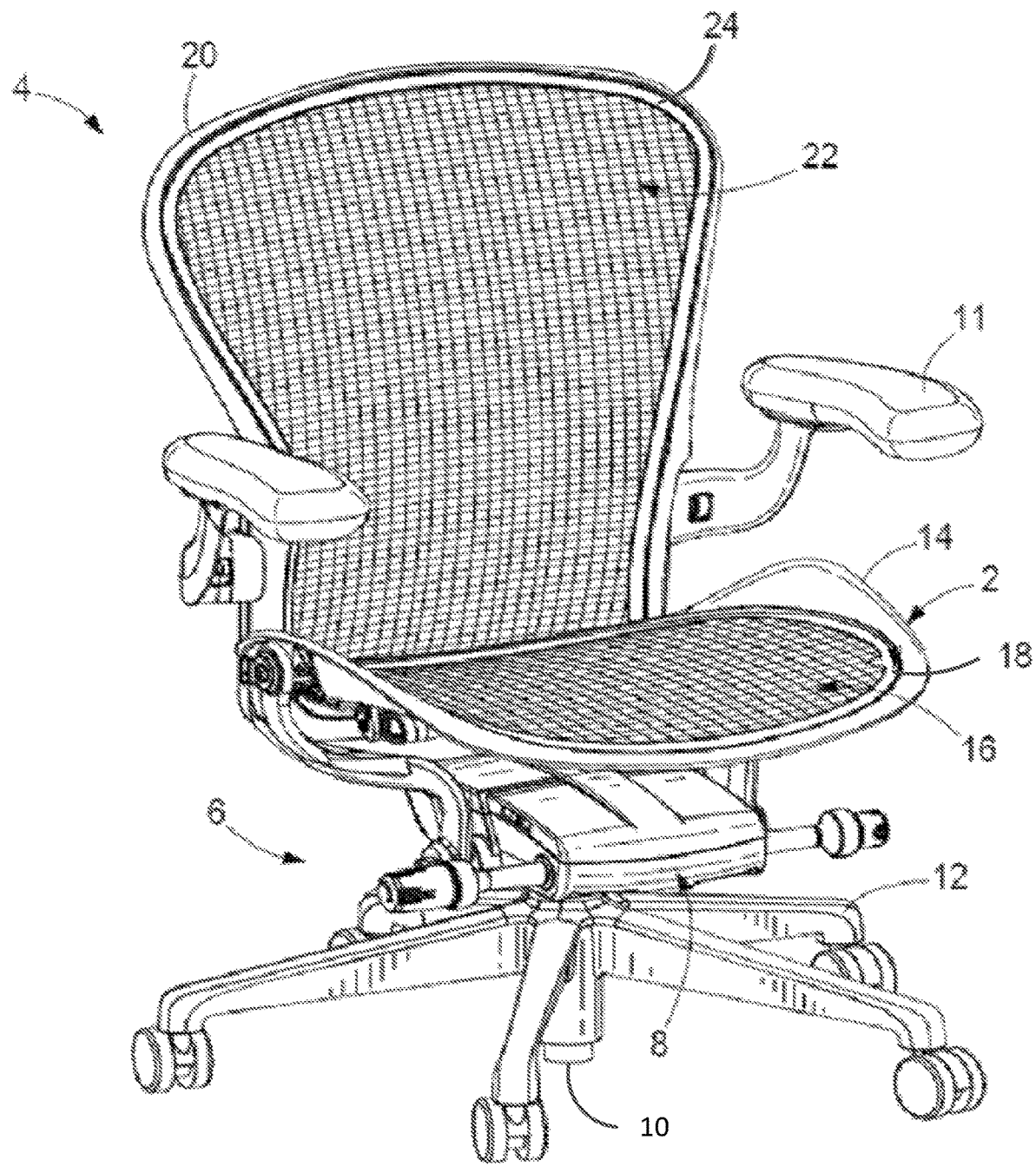
FIG. 1 is a perspective view of a chair including a seat and a backrest, the seat and the backrest each having suspension member.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

It should be noted that a plurality of hardware and software based devices, as well as a plurality of different structural components may be utilized to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software based devices, as well as a plurality of different structural components may be utilized to implement the invention. For example, "controller" and "control unit" described in the specification can include one or more processors, one or more memory modules including non-transitory computer-readable medium, one or more input/output interfaces, and various connections (for example, a system bus) connecting the components. Furthermore, and as described in subsequent paragraphs, the specific configurations illustrated in the drawings are intended to exemplify embodiments of the invention and that other alternative configurations are possible.

Various exemplary embodiments are related to seating structures and methods of manufacturing seating structures. Seating structures may include any structure used to support a body of a user, for example, without limitation, task chairs, side chairs, sofas, airplane seats, vehicle seats, bicycle seats, boat seats, beds, dental and medical seats and beds, auditorium and educational seats, etc. It should be understood that the various methods and devices disclosed herein may be applied to seating structures other than a seat and/or backrest, including for example and without limitation armrests, headrests and other ergonomic positioning features. Although the illustrated embodiments are shown in connection with an office chair, other embodiments can include different configurations.

FIG. 1 shows an exemplary embodiment of a seating structure configured as a chair that includes a seat 2, a backrest 4, and a base 6. The base 6 includes a tilt control housing 8, a support column 10 coupled to and supporting the tilt control housing 8, and a base structure 12 coupled to and supporting the support column 10. A pair of armrests 11 are also connected to the chair.

The seat 2 includes a frame 14, a suspension member 16, and a carrier 18. The carrier 18 retains the suspension member 16 and connects to the frame 14. In the exemplary embodiments shown, the frame 14 is formed as a ring having a front, a back, and a pair of sides defining an opening. The frame 14 may also be formed from side members, a top member, and a bottom member. Different sizes, shapes, and configurations of the frame 14 can be used according to aesthetics, ergonomics, space, or other considers. The frame 14 may be integrally formed as a single, homogenous unit, or formed of separate components.

The backrest 4 includes a frame 20, a suspension member 22, and a carrier 24. The carrier 24 retains the suspension member 22 and connects to the frame 20. In the exemplary embodiments shown, the frame 20 is formed as a ring having a front, a back, and a pair of sides defining an opening. The frame 20 may also be formed from side members, a top member, and a bottom member. Different sizes, shapes, and configurations of the frame 20 can be used according to aesthetics, ergonomics, space, or other considers. The frame 20 may be integrally formed as a single, homogenous unit, or formed of separate components.

Various methods of connecting the suspension member 16, 22 can be used, including bonding and adhesive or mechanical fasteners, such as staples, or in-molding. When the carrier 18, 24 is engaged with the frame 14, 20, the suspension member 16, 22 spans across the seat and backrest openings. It should be understood that the suspension member 16, 22 may be attached to the frame 14, 20 in other suitable ways, such as by directly attaching the suspension member 16, 22 to the frame 14, 20 without a carrier 18, 24, including by molding, bonding, mechanical fasteners, other know devices, and combinations thereof.

Figure 2:
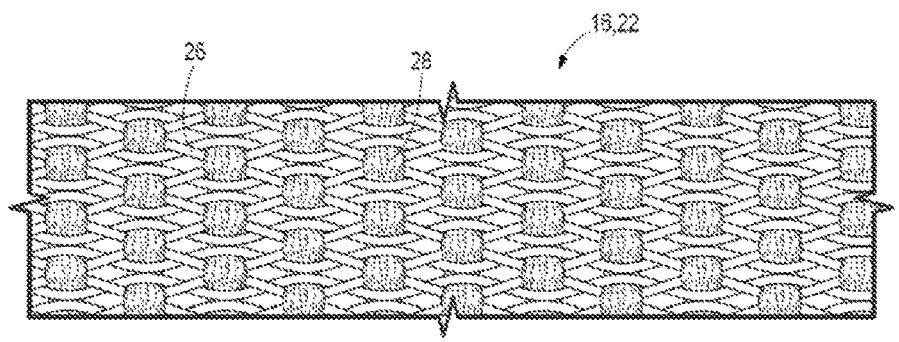
FIG. 2 is a partial view of an exemplary suspension member.

The suspension members 16, 22 may be made of a woven or knit material, including various elastomeric materials or textiles, or various molded polymeric materials. The seat 2 and backrest 4 may utilize the same type of material or different materials for the suspension member 16, 22. In various exemplary embodiments, the suspension member 16, 22 can include a plurality of monofilaments 26 interlaced with a plurality of multifilament strands 28, as shown in FIG. 2. The monofilaments 26 can be the primary load carrying members and run laterally in the warp direction of the seat 2 and backrest 4, while the multifilament strands 28 run longitudinally in the weft direction. Additionally, the monofilaments 26 and/or the multifilaments 28 may be combined to run in both the lateral and longitudinal directions if necessary.

In some embodiments, a blank 64 (FIGS. 6 and 7) is used to create the suspension member 16, 22. The blank 64 can be composed of any material capable of being stretched or molded into a seating surface. In the illustrated embodiment, the blank 64 is a piece of the textile that is stretched and placed in the carrier 18, 24 to form the suspension member 16, 22. In other embodiments, the blank 64 is composed of other types of membranes, not just a woven or knit textile. Before being placed in the carrier 18, 24, the blank 64 is tensioned to the desired stiffness and aligned according to the desired position and orientation. For example, in some embodiments, a color or pattern may be desired at a certain position with the carrier 18, 24. Thus, the blank 64 should be oriented in the appropriate direction and aligned within the carrier 18, 24 according to the desired position of the pattern. Similarly, in some embodiments, it may be desirable to have a certain tension in a particular area of the suspension member 16, 22. To achieve this, a portion of the blank 64 may be tensioned a greater (or lesser) amount. That portion may then be aligned within the carrier 18, 24 according to the desired location.

As will be described in greater detail below, a stretching machine 100 (FIG. 8) can be used to stretch the blank 64 according to the desired tension and align the blank 64 within the suspension member 16, 22. Accordingly, the stretching machine 100 can be used to help achieve the desired characteristics of the suspension member 16, 22. In particular, the stretching machine 100 can be used to achieve characteristics such as the orientation of the blank 64, the position of the blank 64 within the carrier 18, 24, and the tension of the blank 64.

Figure 3:
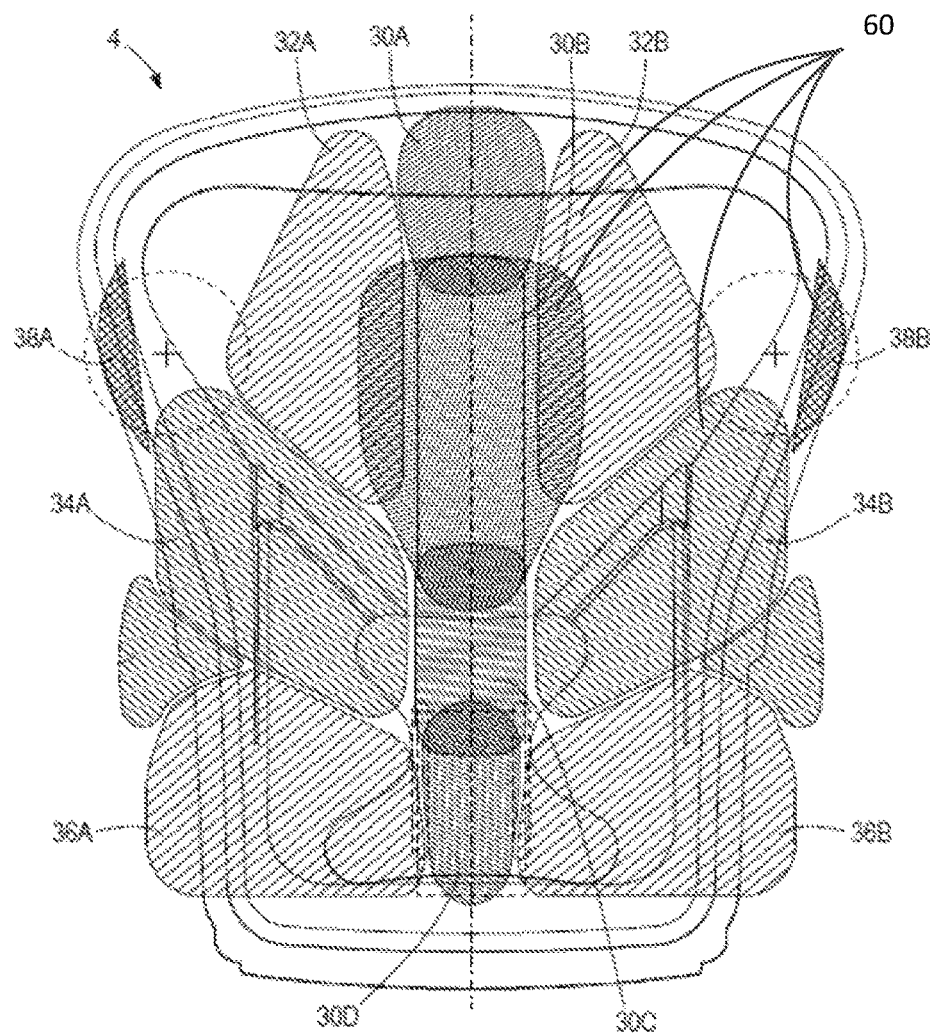
FIG. 3 is a schematic view of the backrest with anatomical zones.
Figure 4:
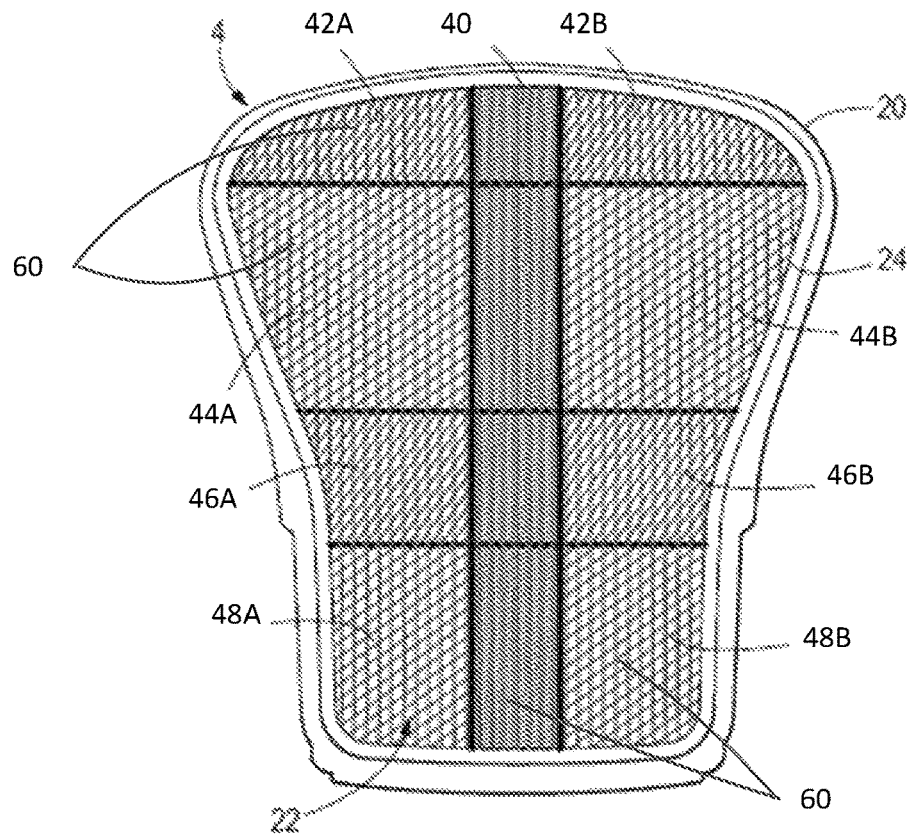
FIG. 4 is a front schematic view of the backrest with different stiffness zones.
Figure 5:
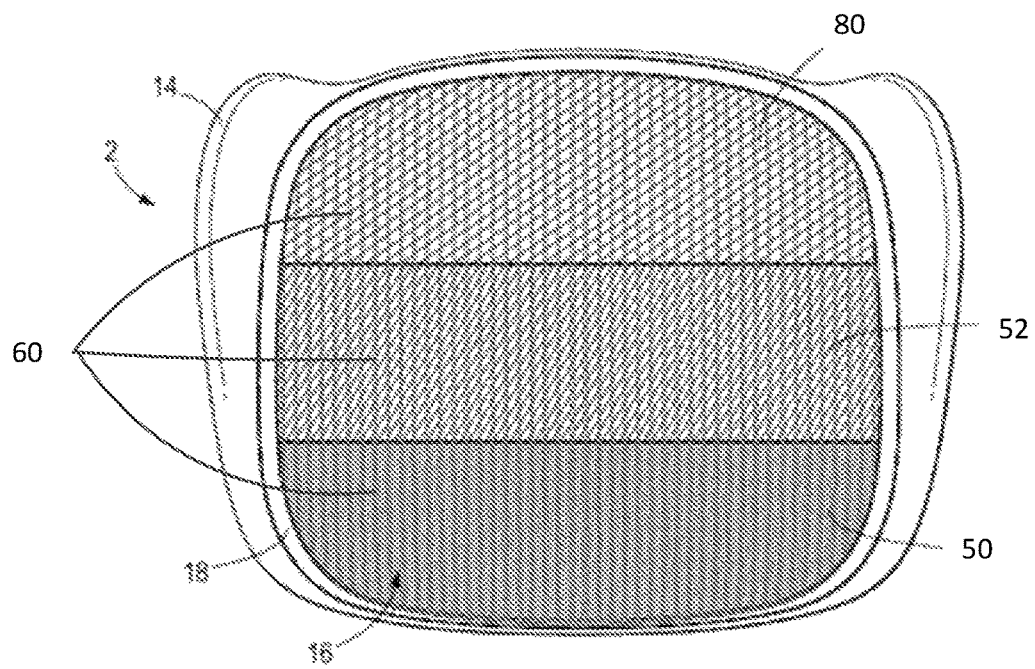
FIG. 5 is a top schematic view of the seat with different stiffness zones.

As shown in FIGS. 3-5, in some embodiments, the suspension member 16, 22 can include different zones (referenced generally as 60), which each have different characteristics. The zones 60 of the suspension member 16, 22 can be aligned within the carrier 18, 24 in order to achieve a designated purpose. For example, in one embodiment, the zones 60 are designated to have different levels of stiffness to increase the comfort and/or support of the seating structure for a user. The zones 60 can then be aligned within the carrier 18, 24 so that the zones 60 having greater stiffness are positioned in locations where more support is desired, and the zones 60 having greater flexibility are positioned in locations were greater comfort is desired. In another embodiment, the zones 60 can have different patterns or colors. In this case, the zones 60 can be arranged within the carrier 18, 24 to create a certain aesthetic appearance.

FIGS. 3-5 illustrate the suspension member 16, 22 divided into different zones 60, where each zone 60 has a different set of characteristics. The zones 60 can have different sizes and shapes. For example, although the zones 60 illustrated in FIGS. 3-5 are generally large geometric shapes, the zones 60 may be other shapes or relative sizes.

In the embodiment illustrated in FIG. 3, the zones 60 correspond to different anatomical zones of a user's back. Accordingly, a different tension and stiffness is desired in each zone 60 to provide comfort and support to the corresponding anatomical zone of the user's back. Furthermore, to achieve the desired characteristic of the suspension member 22, the zones 60 are positioned within the carrier 18, 24 to align with the corresponding anatomical structure that each zone is designated to support.

In the illustrated embodiment, the zones 60 include central zones 30A-D, upper side zones 32A, 32B, middle side zones 34A, 34B, lower side zones 36A, 36B, and shoulder socket zones 38A, 38B. The support of these zones 30, 32, 34 can be controlled by adjusting the stiffness in each zone 60. For example, the central zones 30A-D are provided with a first stiffness or stiffness range, the middle side zones 34A, 34B are provided with a second stiffness or stiffness range, and the upper side zones 32A, 32B and lower side zones 36A, 36B are provided with a third stiffness or stiffness range. In an exemplary embodiment, the first stiffness or range can be configured to provide support, the second stiffness or range can be configured to provide stability, and the third stiffness or range can be configured to relieve pressure or stress. In an exemplary embodiment, this can mean that the second stiffness or range is less than the first stiffness or range and the third stiffness or range is less than the second stiffness or range. In other exemplary embodiments, the stiffness of the central zones 30A-D can vary or be variable, for example increasing from the top zone 30A to the bottom zone 30D, with each zone 30A-D having a greater stiffness than the second stiffness or range.

With reference to FIG. 4, some of the zones 60 can be designated to have more than one characteristic. FIG. 4 shows a backrest 4 having top side zones 42A, 42B, upper side zones 44A, 44B, middle side zones 46A, 46B, and lower side zones 48A, 48B, with each zone 42, 44, and 46 having a different stiffness or stiffness range. In an exemplary embodiment, the middle side zones 46A, 46B have a stiffness or range greater than the upper side zones 44A, 44B and the lower side zones 48A, 48B. In addition, the lower zone 48 has a first color, the middle zone 46 has a second color, and a central zone 40 has a first pattern. The zones 60 are aligned within the suspension member 22 to achieve both an ergonomic purpose and an aesthetic purpose. For example, the zones 60 may be aligned so that the zones 60 with greater stiffness are positioned in locations where more support is needed. The zones 60 may also be aligned so that the pattern of the center zone 40 is positioned in the middle of the suspension member 22 and oriented straight up and down. Similarly, the zones 60 may be aligned so that the first and second colors merge at a location that is approximately ⅓ of the way between the bottom and the top of the suspension member 22.

FIG. 5 illustrates another embodiment of a suspension member 16, in which the zones 60 are each designated to have a different fabric. More specifically, FIG. 5 shows a seat 2 having a front zone 50, a middle zone 52, and a rear zone 54. In an exemplary embodiment, the front zone 50 has a first material with a first color and texture, the middle zone 52 has a second material with a second color and texture, and the rear zone 54 has a third material with a third color and texture. In some embodiments, the first, second, and third materials are the same type of material, but each is a different color. Additionally, in some embodiments, the zones 50, 52, and 54 are not separate and distinct zones 60. Rather, the zones 50, 52, 54 can be variable so that one zone 60 transitions into another zone. For example, the front zone 50 may vary from dark blue to medium blue, the middle zone 52 may be medium blue, and the rear zone 54 may vary from medium blue to light blue. Accordingly, the zones 50, 52, 54 will blend together rather than being separate and distinct.

In some embodiments, the desired characteristics of the suspension member 16, 22 are achieved by mechanically manipulating the blank 64 using a stretching machine 100. The stretching machine 100 can stretch the blank 64 different amounts in each zone 60 to create varying tensions. The stretching machine 100 can also rotate, pull, or push the blank in different directions to align the zones 60, colors, or patterns in the desired position within the carrier 18, 24. The operation of the stretching machine 100 is referred to as the stretching process.

Furthermore, in some embodiments, non-visible markers 72 (FIGS. 6-7) can be used during the stretching process to help achieve the desired characteristics. As used herein, "non-visible" means markers that are not visible to a naked human eye under normal conditions or usage (e.g., light, etc.). More specifically, the non-visible markers 72 cannot be perceived by the human eye in the visual spectrum (i.e., electromagnetic wavelengths approximately between 380 and 780 nanometers). However, when excited by an excitation source 76 (FIG. 8), the non-visible markers 72 become visible either to the human eye, or to a specialized sensor 80, or both. Examples of excitation sources 76 include ultraviolet light (UV light), infrared light (IR light), microwaves, and magnetic fields. Non-visible markers 72 can be woven directly into the blank 64. The blank 64 may include non-visible markers 72 that become visible under UV light, IR light, or both. Monofilament fibers having luminescent properties may be woven into the blank 64 to form the non-visible markers 72. Alternatively, a coating can be applied to certain filaments within the blank 64 to create the non-visible markers 72.

The non-visible markers 72 can be used in various ways to help achieve the desired characteristics of the blank 64, including but not limited to, the orientation of the blank 64, the position of the blank 64 within the carrier 18, 24, the tension of the blank 64, and the creation and arrangement of zones 60. For example, the non-visible markers 72 can be used to measure the tension of the blank 64. In addition, the non-visible markers 72 can be used as indicators to identify the orientation of the blank 64, the location of patterns within the blank 64, or where the tension of the blank 64 should change from one tension to another. Furthermore, the non-visible markers 72 can help create, identify, and align the zones 60 according to the desired arrangement on the blank 64.

Figure 7:
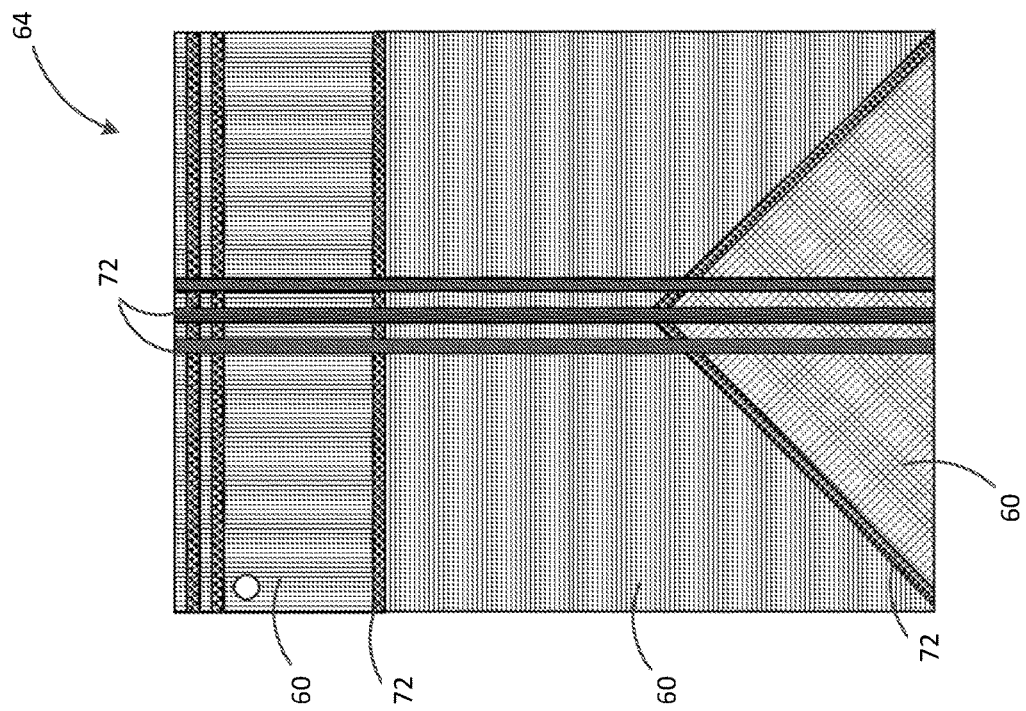
FIG. 7 is a schematic drawing of a blank for a suspension member with different zones and non-visible markers according to another embodiment.
Figure 6:
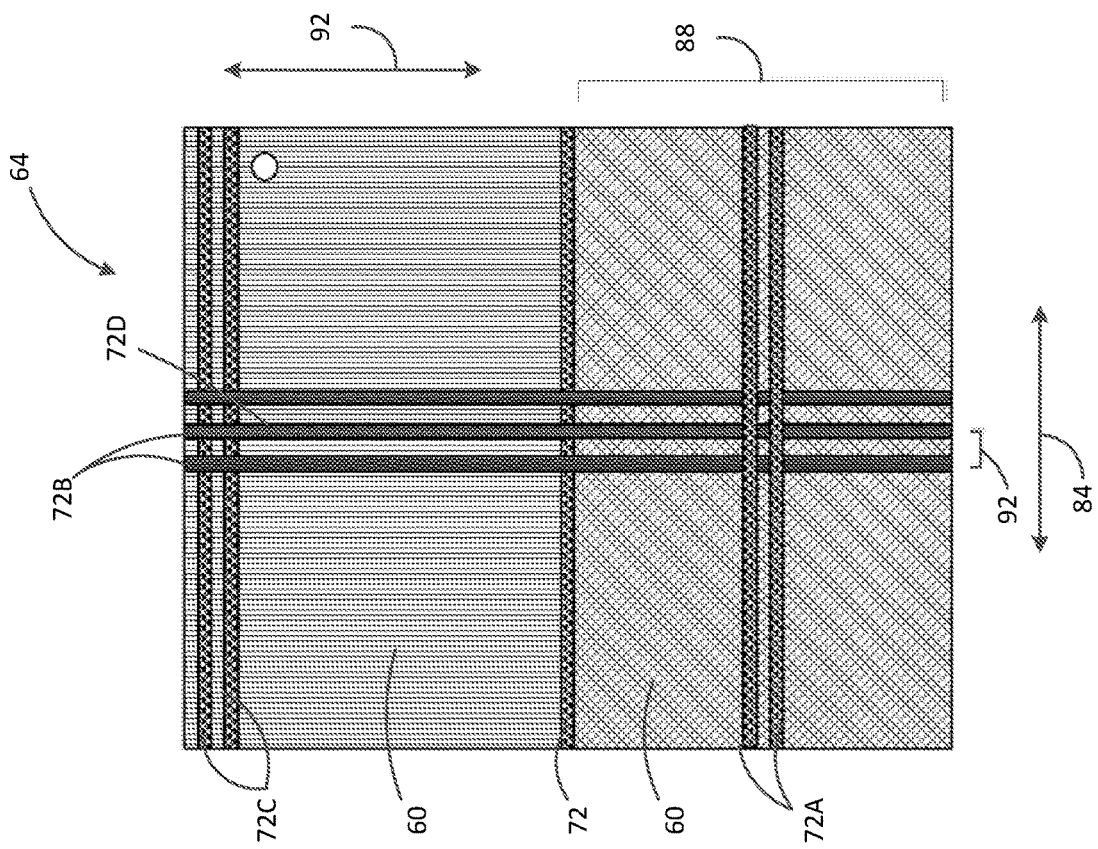
FIG. 6 is a schematic drawing of a blank for a suspension member with different zones and non-visible markers according to one embodiment.

FIGS. 6 and 7 provide examples of blanks 64 with non-visible markers 72 to help illustrate some of the ways in which the non-visible markers 72 can be used to achieve the desired characteristics. In one embodiment, the non-visible markers 72 can be used to measure the tension of the blank 64 during the stretching process so that a desired stiffness can be achieved in each zone 60 of the suspension member 16, 22. This can be done in various ways. In one embodiment, the non-visible markers can be used to directly measure the tension of the blank 64. For example, some of the non-visible markers 72A may have a property in which the luminescence of the non-visible marker 72A changes proportionally with strain. When this is the case, the non-visible markers 72A can be used to directly measure strain, and thus, the stiffness of the blank 64. In this embodiment, the non-visible markers 72A are oriented parallel to the direction of the force. For example, in one embodiment, the blank 64 is stretched in a first direction, indicated by arrow 84 in FIG. 6. When the non-visible markers 72A also extend in the first direction 84 (i.e., parallel to the direction the blank 64 is being stretched) and are positioned within the area 88 of the blank 64 being stretched, the non-visible markers 72A will be strained. As the non-visible markers 72A are strained, the intensity of the luminescence of the non-visible markers 72A changes proportional to the amount of strain. Therefore, the tension of the blank 64 can be measured by measuring the change in luminescence of the non-visible markers 72A. Sensors 80 (FIG. 8) may be used to measure the change in luminescence of the non-visible markers 72A.

In other embodiments, the non-visible markers 72 can be used to measure the tension of the blank 64 based on the displacement of the non-visible markers 72, rather than a change in luminescence. In this embodiment, the non-visible markers 72B are oriented perpendicular to the force. For example, if the blank 64 is being stretched in the first direction 84, the non-visible markers 72B extending in a second direction, indicated by arrow 92 (e.g., perpendicular direction the blank 64 is being stretched), can be used to measure the tension of the blank 64. As the blank 64 is stretched, the segments of the non-visible markers 72B that extend through the area 88 of the blank 64 being stretched may be displaced. The tension of the blank 64 can be measured by measuring the displacement of the relevant segments of the non-visible markers 72B. The displacement is measured by measuring the change in distance between two non-visible markers 72B.

Furthermore, the non-visible markers 72 can be used as indicators to help orient and align the blank 64, or to identify elements of the blank, including the location of fabric patterns or zones 60. With continued reference to FIGS. 6 and 7, the non-visible markers 72 can be placed at specific positions on the blank 64 to identify an element of the blank 64. Once identified, the non-visible markers 72 can then be used as guidance for moving the blank 64 into the desired position and for identifying the borders of the zones 60. For example, in one embodiment, the non-visible markers 72 can be used to orient the blank 64 within the stretching machine 100 by identifying the top of the blank 64. In another embodiment, the non-visible markers 72 can be placed along borders of the zones 60 to identify the location of each zone 60. The non-visible markers 72 can be used as guidance to reposition the blank 64 so that the zones 60 are aligned according to a desired arrangement. Additionally, the non-visible markers 72 can be used to indicate the intersection of two zones 60, where there is a desired change in tension. Therefore, the non-visible markers 72 can help identify which areas of the blank 64 need to be tensioned more or less. In the embodiments illustrated in FIGS. 6 and 7, the non-visible markers 72 are positioned along the top and the center of the blank 64. The non-visible markers 72 are also placed at the intersection of two or more zones 60 to identify transition lines between zones 60 where there is a desired change in tension and stiffness.

FIGS. 8-12 illustrate a stretching machine 100 for holding and manipulating the suspension members 16, 22 during manufacture of the seat 2 or the backrest 4. The stretching machine 100 is capable of stretching or tensioning the blank 64 to properly align the suspension member 16, 22 within the carrier 18, 24. The mechanical manipulation may be applied to the blank 64, including any of the engineered textiles described herein. In one embodiment, the stretching machine 100 includes a support frame 110 supporting a plurality of tensioning mechanisms 118A-D and a loom 104. The loom 104 includes a first loom member 106 and a second loom member (not shown) positioned opposite the first loom member 106. The loom 104 is configured to receive the blank 64 between the first and second loom members 106 once the blank 64 is stretched. The loom 104 defines a perimeter surrounding an area of the blank 64 that will eventually be fitted into one of the carriers 18, 24. The tensioning mechanisms 118A-D are positioned around the outside of the perimeter of the loom 104 for tensioning the blank 64. Although the stretching machine 100 is described herein includes the loom 104, in other embodiments, the stretching machine 100 does not include a loom.

In the illustrated embodiment, the stretching machine 100 includes a first tensioning mechanism 118A and a second tensioning mechanism 118B. The first tensioning mechanism 118A is coupled to the support frame 110 for stretching the blank 64 in a first direction. The second tensioning mechanism 118B is coupled to the support frame 110 for stretching the blank 64 in a second direction that is perpendicular to the first direction. In the illustrated embodiment, the stretching machine 100 also includes a third tensioning mechanism 118C and a fourth tensioning mechanism 118D. The third tensioning mechanism 118C is configured to stretch the blank 64 in a third direction that is parallel to the first direction, but opposes the first tensioning mechanism 118A. The fourth tensioning mechanism 118D is configured to stretch the blank 64 in a fourth direction that is parallel to the second direction, but opposes the second tensioning mechanism 118B. In other embodiments, the second, third, or fourth tensioning mechanisms 118B-D can be excluded from the stretching machine 100.

Each tensioning mechanism 118A-D includes one or more clamping elements 122 and at least one actuator 126. The clamping elements 122 are configured to grip a portion of the blank 64 proximate an edge of the blank 64. The actuators 126 are configured to move the clamping elements 122 to stretch the blank 64. In the illustrated embodiment, the tensioning mechanisms 118A, 118C along the sides of the stretching machine 100 each include three clamping elements 122 and three actuators 126. The tensioning mechanisms 118B, 118D on the top and bottom of the stretching machine 100 each include three clamping elements 122 and one actuator 126. In other embodiments, each tensioning mechanism 118A-D may include fewer or more clamping elements.

Figure 10:
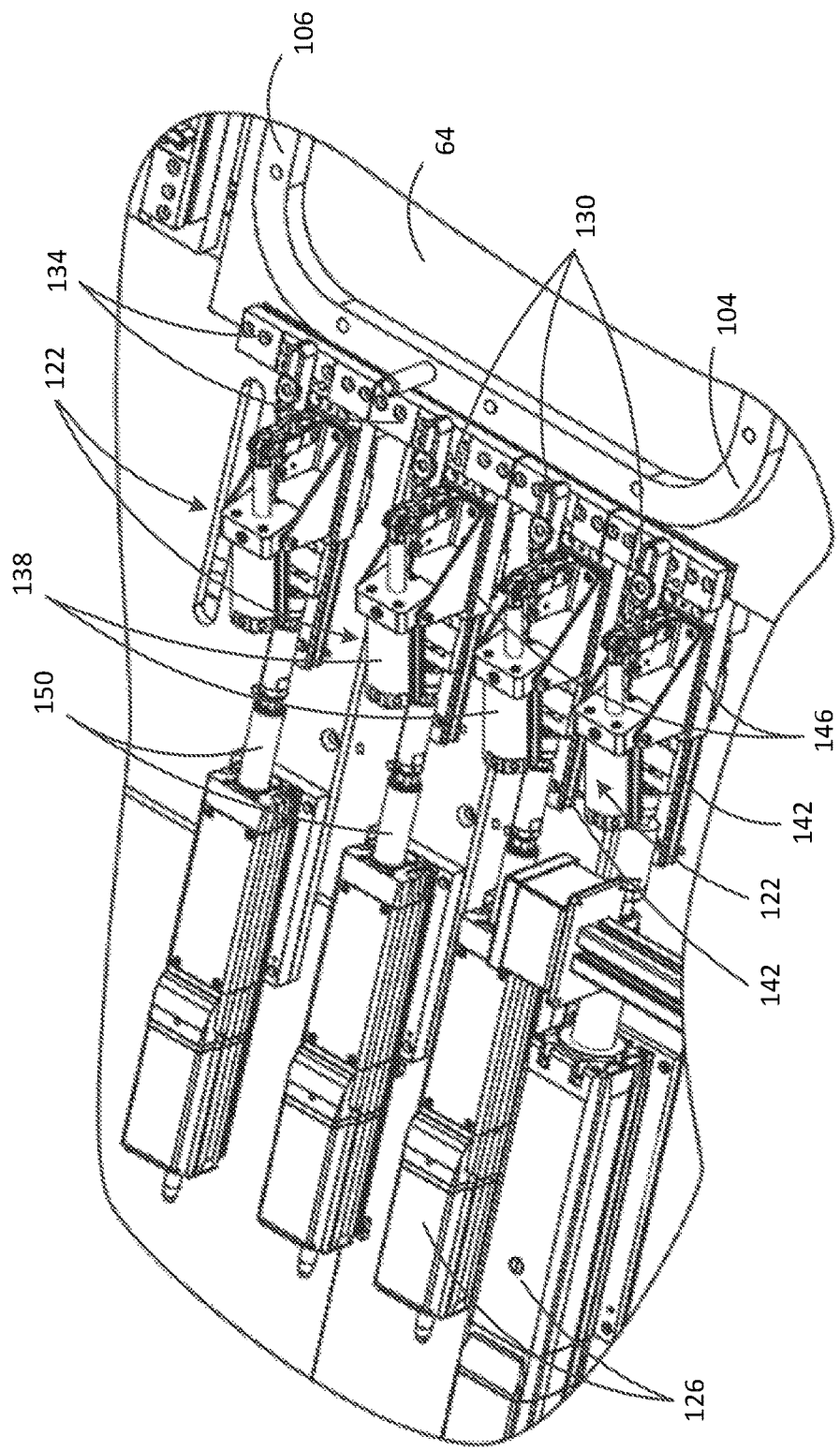
FIG. 10 is a detailed view of a plurality of tensioning mechanisms of the stretching machine of FIG. 8.
Figure 11:
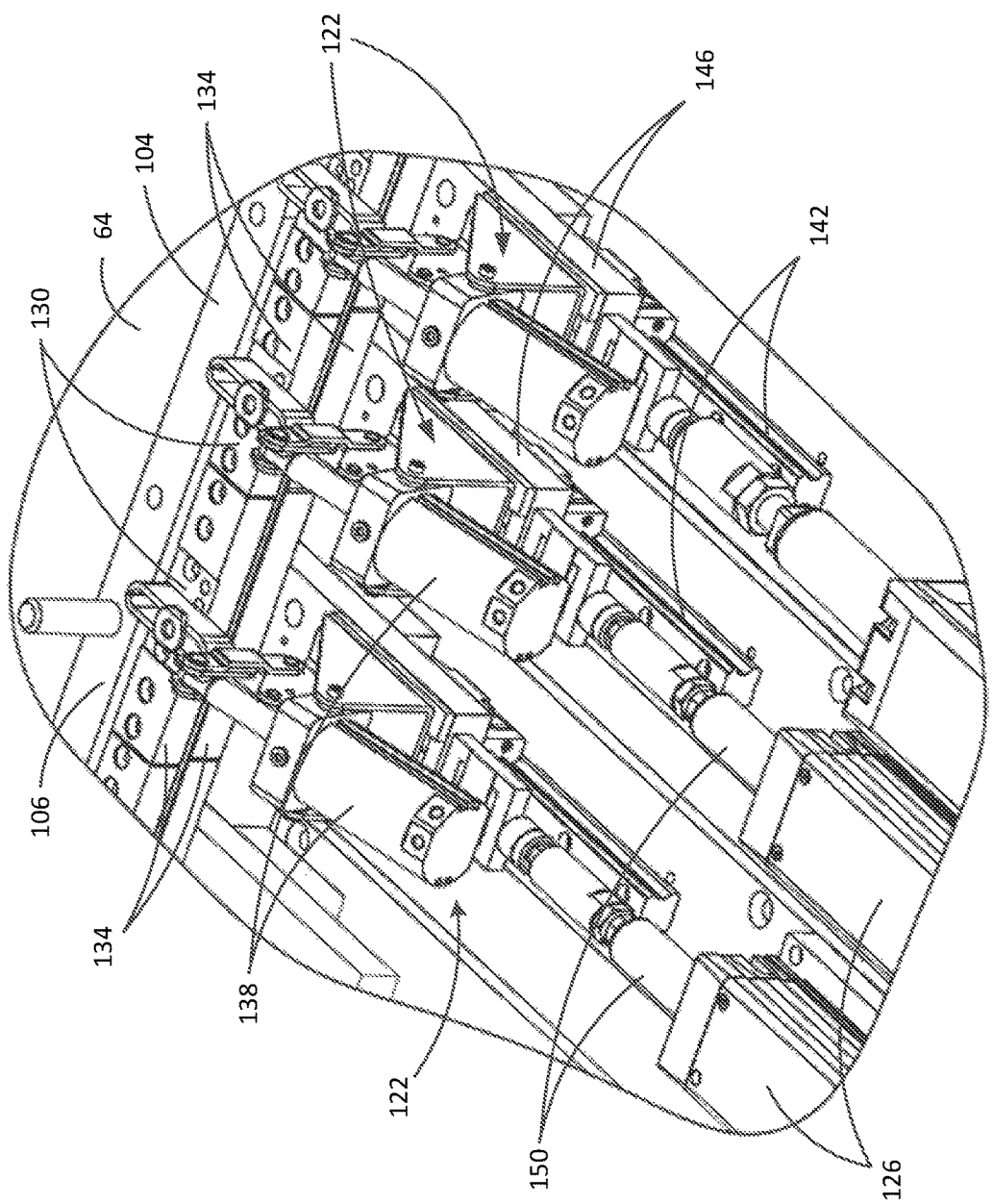
FIG. 11 another detailed view of the plurality of tensioning mechanisms of the stretching machine of FIG. 8.

As shown in FIGS. 10 and 11, each clamping element 122 includes a clamping head 130 that can grip a portion of the blank 64. The clamping heads 130 are movable between a clamped position and a released position. The clamping heads 130 grip a portion of the blank 64 when in the clamped position, and release the blank 64 when in the released position. In the illustrated embodiment, the clamping heads 130 are formed by two plates 134 that can clamp together to grip the blank 64. In other embodiments, the clamping heads 130 can be other shapes or mechanisms capable of gripping the blank 64. A lever 138 controls the movement of the clamping head 130 between the clamped position and the released position. The levers 138 of each clamping element 122 can be controlled manually or electronically.

The clamping elements 122 are connected to and moveable relative to the support frame 110. More specifically, the clamping elements 122 can move along a linear path in directions towards and away from the center of the loom 104. The farther away from the center of the loom 104 each clamping element 122 moves, the greater tension applied to the portion of the blank 64 gripped by that clamping element 122. Each clamping element 122 is independently movable relative to the other clamping elements 122. Accordingly, some clamping elements 122 can move a greater distance radially outward from the center of the loom 104 to vary the tension between different areas of the blank 64.

Figure 8:
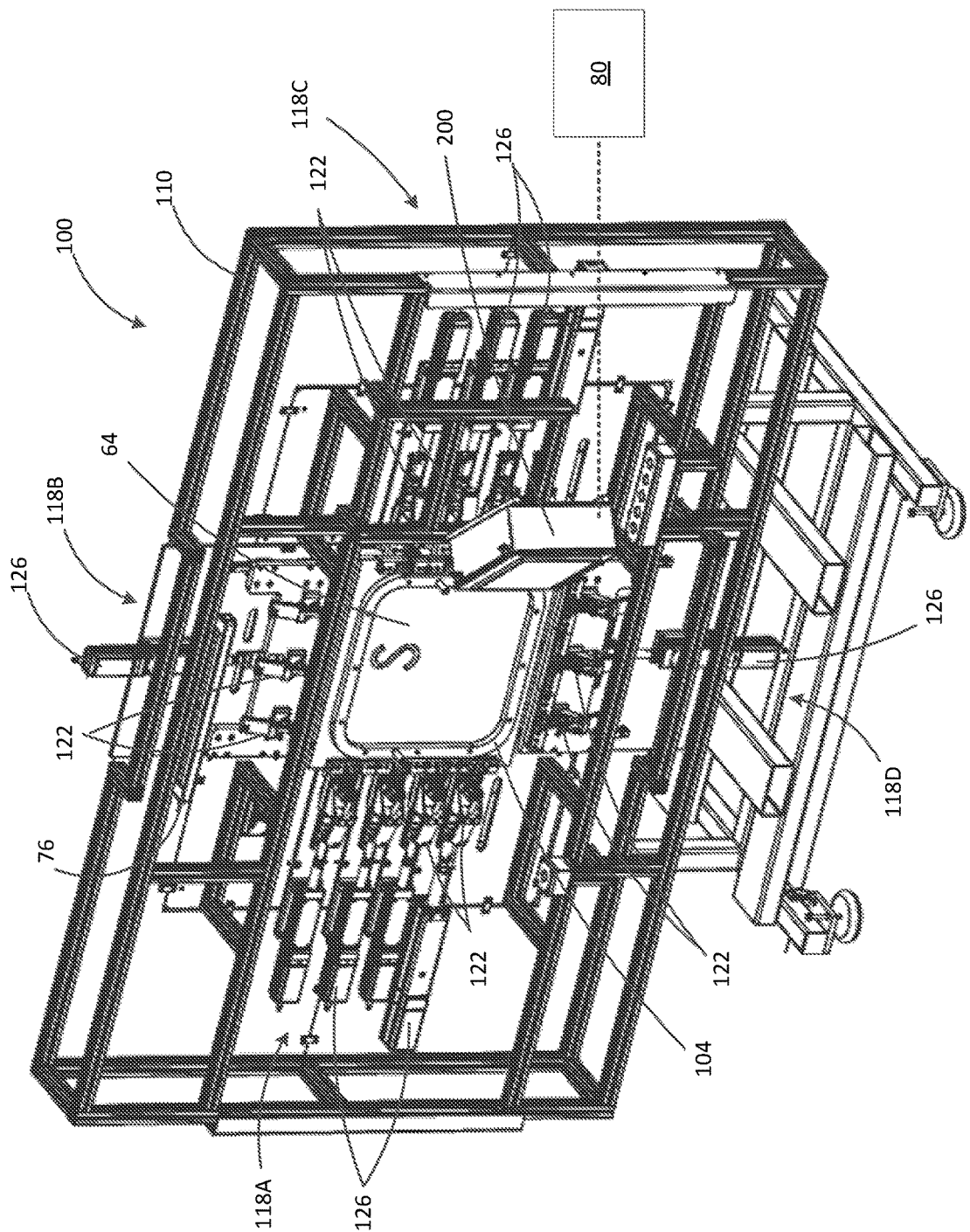
FIG. 8 is a perspective view of a stretching machine for manufacturing a chair component with a suspension member.
Figure 9:
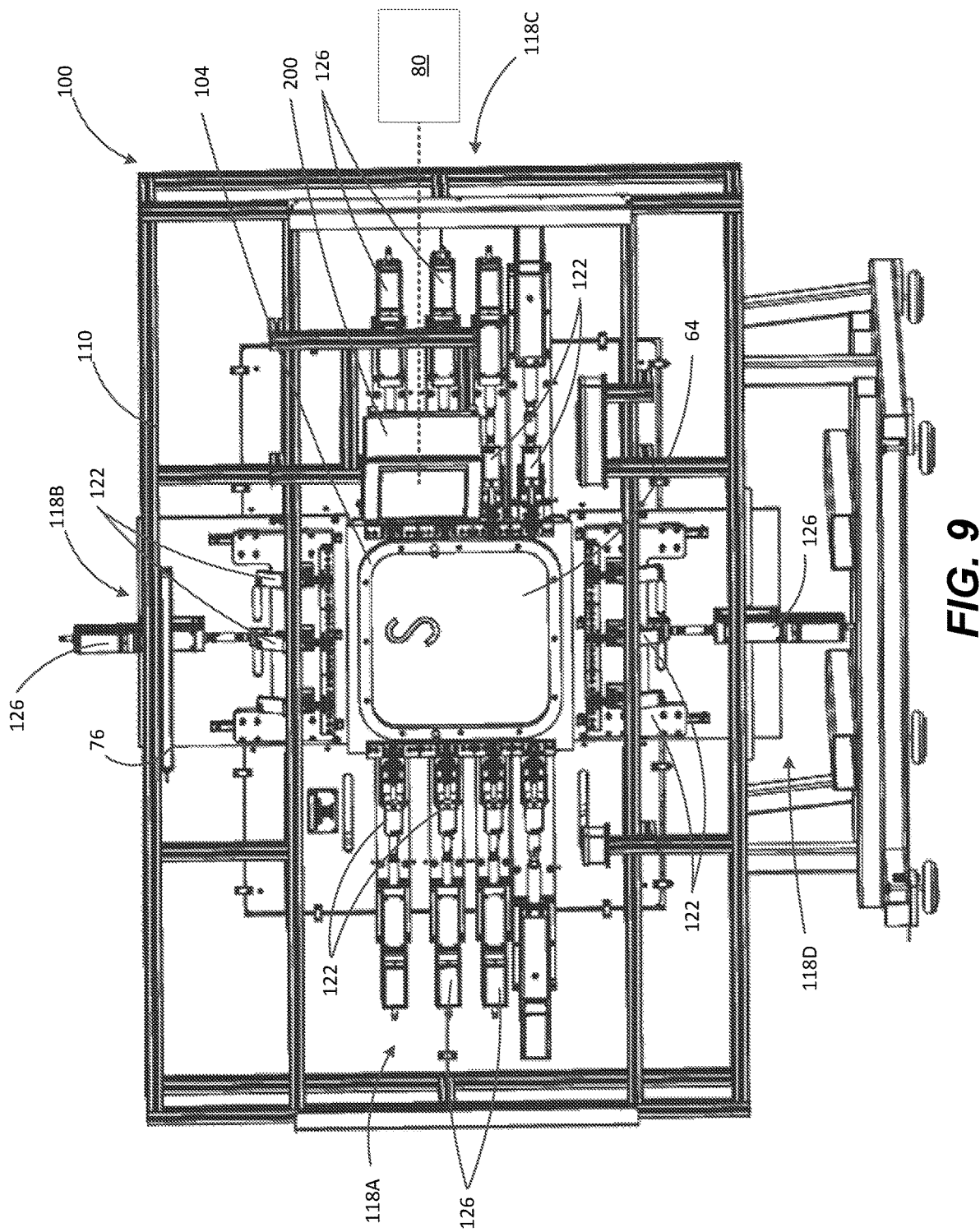
FIG. 9 is a front view of the stretching machine of FIG. 8.

Each clamping element 122 is slidable along a corresponding rail 142. Each clamping element 122 includes a carriage 146 that supports the clamping head 130 and the lever 138. The carriage 146 is slidably connected to the rail 142 such that the clamping element 122 can move in a linear direction along the rail 142. Movement of the clamping elements 122 is controlled by the plurality of actuators 126. In some embodiments, the clamping elements 122 are individually moved by a corresponding actuator 126, with each actuator 126 controlled to move a respective clamping element 122. In other embodiments, at least one of the tensioning mechanisms 118A-D may include a single actuator 126 that independently controls more than one clamping element 122. For example, as shown in FIG. 8, the tensioning mechanisms 118A, 118C on the sides of the stretching machine 100 each include a separate actuator 126 for each clamping element 122, while the tensioning mechanisms 118B, 118D on the top and the bottom of the stretching machine 100 include one actuator 126 that controls multiple clamping elements 122. The clamping elements 122 are connected to the actuators 126 by rods 150 that are secured to the carriage 146. The actuators 126 may be, for example, pneumatic (e.g., driven by air) or electro-mechanical (e.g., servo motors driving spindles).

Furthermore, in other embodiments, the actuators 126 can move the plurality of tensioning mechanisms 118A-D and the blank 64 together as a unified group relative to the loom 104. The actuators 126 can move the tensioning mechanisms 118A-D and the blank 64 up and down and left to right in order to position a specific portion of the blank 64 within the perimeter of the loom 104 as desired. In some embodiments, the actuators 126 can also rotate the blank 64 to align the blank 64 within the perimeter of the loom 104. The non-visible markers 72 can be used to help align the blank 64 relative to the loom 104.

Referring back to FIGS. 8 and 9, the stretching machine 100 includes the excitation source 76 oriented to direct a beam toward the blank 64 to reveal the non-visible markers 72. The illustrated source 76 includes a UV light and an IR light. In other embodiments, the number and type of excitation sources 76 can vary. The excitation source 76 can be fixed to the support frame 110 of the stretching machine 100 at any position in which the beam can be directed toward the blank 64. In some embodiments, the excitation source 76 is not fixed to the stretching machine 100, but rather, may be a distinct and separate element. Similarly, the excitation source 76 may be removably coupled to the stretching machine 100.

The stretching machine 100 further includes a sensor 80 oriented to sense the non-visible markers 72 when the non-visible markers 72 are excited by the excitation source 76. Similar to the excitation source 76, the sensor 80 may be fixed (removably or permanently) to the support frame 110 or may be a distinct and separate element. The sensor 80 can sense the luminescence given off by the non-visible markers 72 when in an excited state. It should also be understood that in some embodiments, the luminescence of the non-visible markers 72 is visible to the human eye, while in other embodiments, the sensor 80 is needed. In the illustrated embodiment, the sensor 80 is a camera capable of detecting the luminescence induced by the UV light and IR light. In other embodiments, other types of sensors 80 may be used. It should be understood that in some embodiments, the sensor 80 is capable of sensing other characteristics beyond the luminescence of the blank 64.

Figure 12:
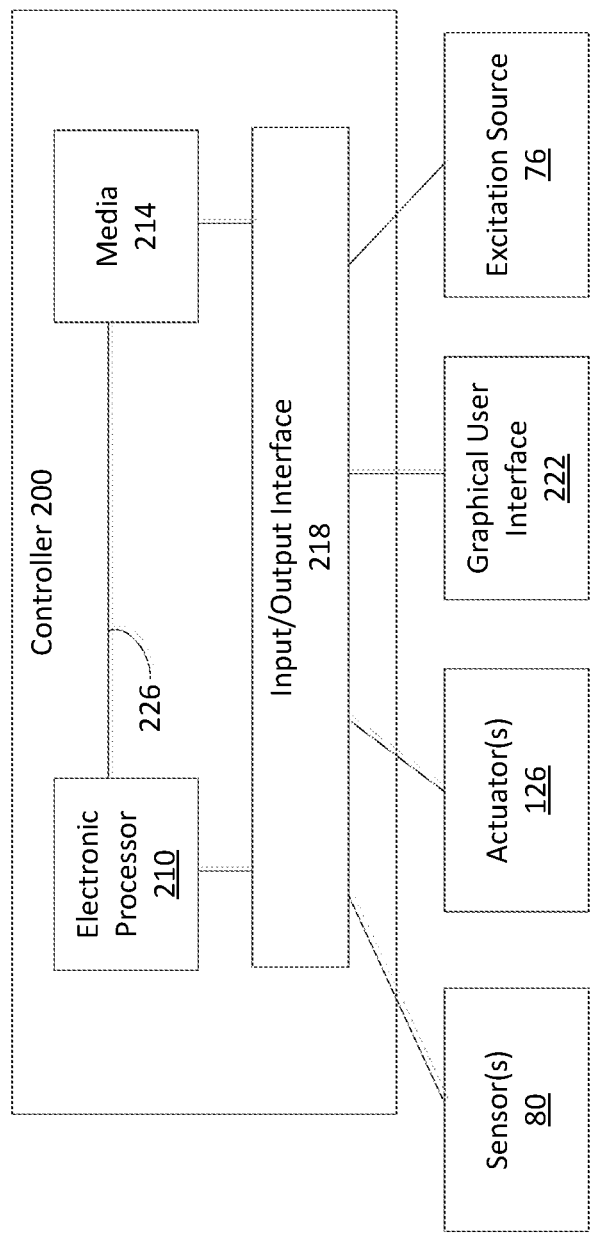
FIG. 12 is a schematic diagram of a controller of the tensioning machine.

A controller 200 communicates with the excitation source(s) 76, the sensor 80, the actuators 126, and the levers 138 of the clamping elements 122 to control the operation of the stretching machine 100. As shown in FIG. 12, the controller 200 can include an electronic processor 210, a non-transitory computer-readable media 214, an input/output interface 218, and a graphical user interface 222. The electronic processor 210, the computer-readable media 214, the input/output interface 218, and the graphical user interface 222 are connected by and communicate through one or more communication lines or buses 226. It should be understood that in other constructions, the controller 200 includes additional, fewer, or different components. The controller 200 can communicate with the actuators 126, the levers 138, the excitation source, 76 and the sensor 80 via wireless communications, such as Bluetooth. In other embodiments, the controller 200 is hardwired to these components. It should be understood that in some embodiments the excitation source 76 is not in communication with the controller 200, but rather, is controlled manually by an operator.

The controller 200 sends a control signal to the actuators 126 to move the clamping elements 122. The control signals can include unique instructions corresponding to each clamping element 122 in order to independently move each clamping element 122. Due to the independent movement capability of each clamping element 122, the blank 64 may be stretched different amounts by each clamping element 122, thereby inducing a different amount of tension to different zones 60 of the blank 64. The controller 200 can also send a control signal to the alignment actuators 126 to move the blank 64 to a different position within the loom 104.

Figure 13:
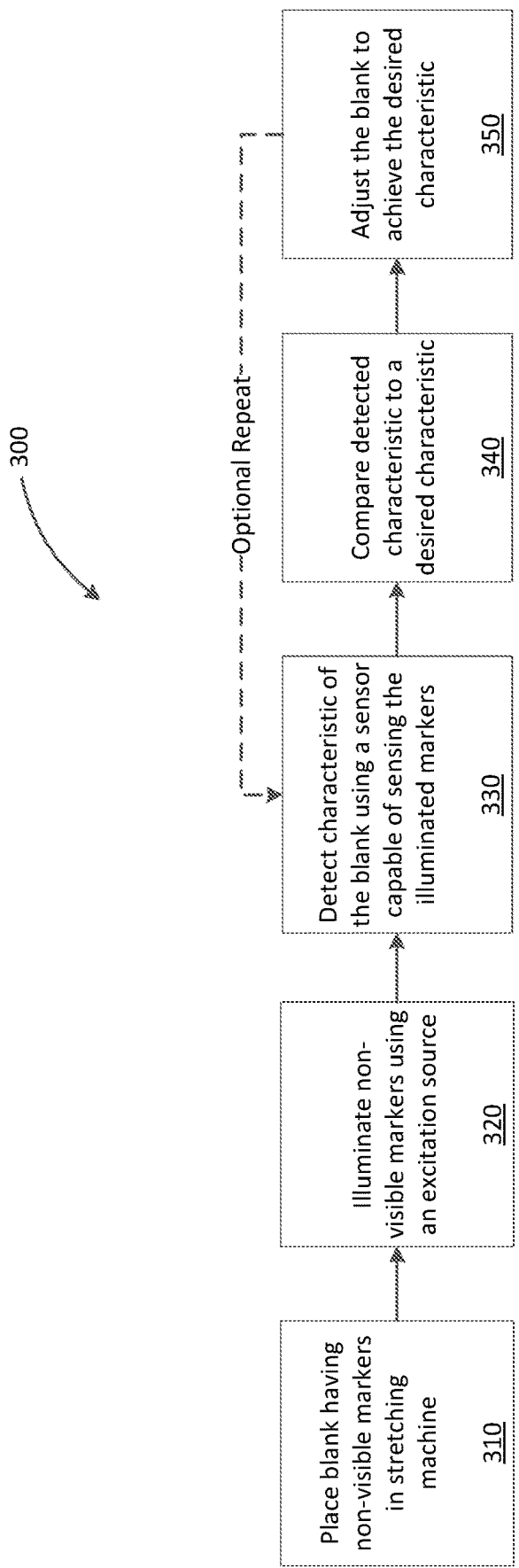
FIG. 13 is a flow chart depicting a method of aligning a blank of suspension material using the stretching machine.

FIG. 13 illustrates a method 300 of manufacturing suspension seating with the suspension members 16, 22 having the non-visible markers 72. The method 300 includes placing the blank 64 of suspension material having the non-visible markers 72 into the stretching machine (step 310). In the illustrated embodiment, the blank 64 with the non-visible markers 72 is positioned over the second loom member. The clamping elements 122 are clamped onto and engage the blank 64. The levers 138 are used to move the clamping elements 122 to the clamped position to hold the blank 64 in place. Once the blank 64 is positioned in the stretching machine 100, the controller 200 sends instructions to the excitation source 76 to illuminate the blank 64 so that the non-visible markers 72 become visible to the sensor 80 (step 320).

The controller 200 can monitor characteristics of the blank 64 during the stretching process to help ensure that the blank 64 is positioned properly and is properly stretched (steps 330, 340, and 350). The characteristics can be conveyed to the controller 200 by the non-visible markers 72 and the sensor 80. In the illustrated embodiment, the controller 200 sends instructions to the sensor 80 to detect a characteristic of the blank 64 that can be conveyed by the non-visible markers 72 (step 330). For example, the non-visible markers 72 may help identify the orientation, position, or tension of the blank 64. The non-visible markers 72 may also help identify the location of the zones 60 having specific characteristics.

The controller 200 then compares the detected characteristic to a desired characteristic (step 340). If the detected characteristic does not satisfy the properties of the desired characteristic, the controller 200 adjusts the blank 64 until the detected characteristic satisfies the desired characteristic (step 350). For example, the controller 200 sends instructions to the tensioning mechanism 118A-D to stretch/move the blank 64. The controller 200 uses the non-visible markers 72 for guidance to align and stretch the blank 64. In some embodiments, the controller 200 repeats the process of detecting the characteristic and comparing it to a desired characteristic until the detected characteristic satisfies the desired characteristic (steps 330, 340, and 350).

As described above, the non-visible markers 72 can identify characteristics of the blank in several different ways, and can guide the controller 200 to help achieve the desired characteristics in several different ways. The following are exemplary ways to carry out steps 330, 340, and 350 of the method 300. In other words, the following are embodiments of how the controller 200 may use the non-visible markers 72 to identify characteristics of the blank 64 (step 330) and to adjust the blank 64 to achieve a desired characteristic (step 350).

In one embodiment, the non-visible markers 72 can be used to help orient and position of the blank 64. The controller 200 communicates with the sensor 80 to identify the non-visible markers 72 and ensure that the blank 64 is correctly oriented and centered within the perimeter of the loom 104. For example, in the embodiment shown in FIG. 6, the blank 64 includes two parallel non-visible markers 72C along the edge of the blank 64 to identify the top. The controller 200 can communicate with the sensor 80 to locate the two parallel non-visible markers 72C (step 330). The controller 200 can then determine whether the blank 64 is oriented with the two non-visible markers 72C at the top as desired (step 340). When the controller 200 determines that the non-visible markers 72C are not oriented along the top, the controller 200 can execute instructions to adjust the blank 64 using the non-visible markers 72C as guidance (step 350).

Similarly, in another embodiment, the controller 200 can use the non-visible markers 72 to align and center the blank 64 within the perimeter of the loom 104. For example, in the embodiment shown in FIG. 6, the blank 64 includes a non-visible marker 72D extending through the center of the blank 64. The controller 200 can communicate with the sensor 80 to locate the non-visible marker 72D closest to the center of the blank 64 (step 330). The controller 200 can then determine whether the non-visible marker 72D is centered within the perimeter of the loom 104 as desired (step 340). When the controller 200 determines that the non-visible marker 72D is not centered within the loom 104, the controller 200 can execute instructions to the actuators 126 to adjust the blank 64 so that the blank 64 is centered (step 350).

Once the blank 64 is in the desired position, the controller 200 can send a control signal to the actuators 126 to move the clamping elements 122 radially outward to stretch the blank 64. As previously discussed, the controller 200 can independently control the actuators 126 to move the clamping elements 122 to different amounts to achieve the desired tension, stiffness, and/or position of each zone 60. The controller 200 can use the non-visible markers 72 to help achieve the desired tension in each zone 60. Specifically, the controller 200 can execute steps 330, 340, and 350 of the method 300 according to the following embodiments.

In one embodiment, the controller 200 communicates with the sensor 80 to monitor the tension of the blank 64 based on the strain of the non-visible marker 72. When the non-visible marker 72 has the property in which the intensity of the luminescence changes proportionally to the amount of strain induced in the non-visible marker, the controller 200 can monitor the change in luminescence to determine the tension on the blank 64. More specifically, controller 20 can communicate with the sensor 80 determine the change in luminescence of a non-visible marker 72 (step 330). The controller 200 can calculate the tension of the blank 64 based on the change in luminescence. The controller 200 can then compare the calculated tension with a desired tension (step 340). When the calculated tension is not within the desired tension range, the controller 200 can execute instructions to adjust the blank 64 (step 350). More specifically, the controller 200 can send instructions to the actuators 126 to move the clamping elements 122 in the appropriate direction to either increase or decrease the tension on the blank 64 (step 350). In other words, when the luminescence of the non-visible marker 72 does not indicate that enough strain is being exerted on the non-visible marker 72 to achieve the desired stiffness, the controller 200 can send a control signal to one or more of the actuators 126 to adjust the blank 64 (step 350). The controller 200 can continue to monitor the luminescence of the non-visible marker 72 and control the actuators 126 to adjust the blank 64 until the blank 64 reaches the desired tension.

In another embodiment, the controller 200 monitors the displacement of the non-visible markers 72 to achieve the desired tension of the zones 60. When two non-visible markers 72 are positioned adjacent one another on the blank 64 (see FIGS. 6 and 7), the controller 200 can monitor the change in distance between the two non-visible markers 72 as the blank 64 is being stretched by the tensioning mechanisms 118A-D. The controller 200 can calculate the tension of the blank 64 based on the displacement of the non-visible markers 72.

More specifically, the controller 200 can communicate with the sensor 76 to identify the change in distance between two of the non-visible markers 72 (step 330). The controller 200 can then compare the sensed change in distance to the desired change in distance (step 340). When the controller 200 determines that the sensed change in distance does not satisfy the desired changed in distance, the controller 200 can execute instructions to the actuators 126 to adjust the distance between the non-visible markers 72, and thus, the tension of the blank 64 (step 350). For example, if a 10% strain is the desired condition, the controller 200 executes instructions to stretch the blank 64 until the non-visible markers 72 are at a distance that is 10% greater than the starting distance. In other words, if the distance between the non-visible markers 72 is 200 mm, the controller 200 sends a control signal to the actuators 126 to stretch the blank 64 until the distance between the non-visible markers 72 is 220 mm. In other embodiments, the controller 200 calculates the tension of the blank 64 based on the change in distance and compares the calculated tension to a desired tension (step 340). When the calculated tension is not within range of the desired tension, the controller 200 can send a control signal to the actuators 126 to adjust the tension of the blank 64 (step 350).

In yet another embodiment, the controller 200 can use the non-visible markers 72 as indicators to identify characteristics of the zones 60 to ensure that the zones 60 are positioned and tensioned according to a desired arrangement. For example, the non-visible markers 72 can be placed along borders of the zones 60 so that the controller 200 can identify the position of the zones 60 using the sensor 80 (step 330). The controller 200 can then compare the location of the zones 60 to a desired arrangement of the zones 60 (step 340). In some embodiments, the non-visible markers 72 can also indicate an additional characteristic of a particular zone besides the position of that zone 60. For example, in one embodiment, a plurality of non-visible markers 72 is located in each zone 60 to create tick marks. The number of tick marks can indicate an additional characteristic, such as desired tension of that zone 60. In this case, the controller 200 can compare any of the sensed characteristics (i.e., the position or tension) of the zones 60 to a desired characteristic (i.e., a desired position or tension) (step 340). For example, the controller 200 can determine whether the sensed zone borders are aligned with the appropriate tensioning mechanisms 118A-D. When the sensed zone borders are not aligned with the appropriate tensioning mechanisms 118A-D, the controller 200 can adjust the blank 64 (step 350). Once the zones 60 are aligned, the controller 200 can also execute instructions to the actuators 126 to adjust the tension of each zone 600 until the desired tension is achieved (step 350). In this embodiment, the non-visible markers 72 help the controller 200 ensure that changes in tension are made at the appropriate locations and that the desired tensions of each zone 60 are achieved.

It should be understood that aspects of the various embodiments described herein can be combined to create other embodiments. For example, some embodiments may use the non-visible markers 72 to measure strain as well as to identify the borders of the zones 60 and align the blank 64.

Figure 14:
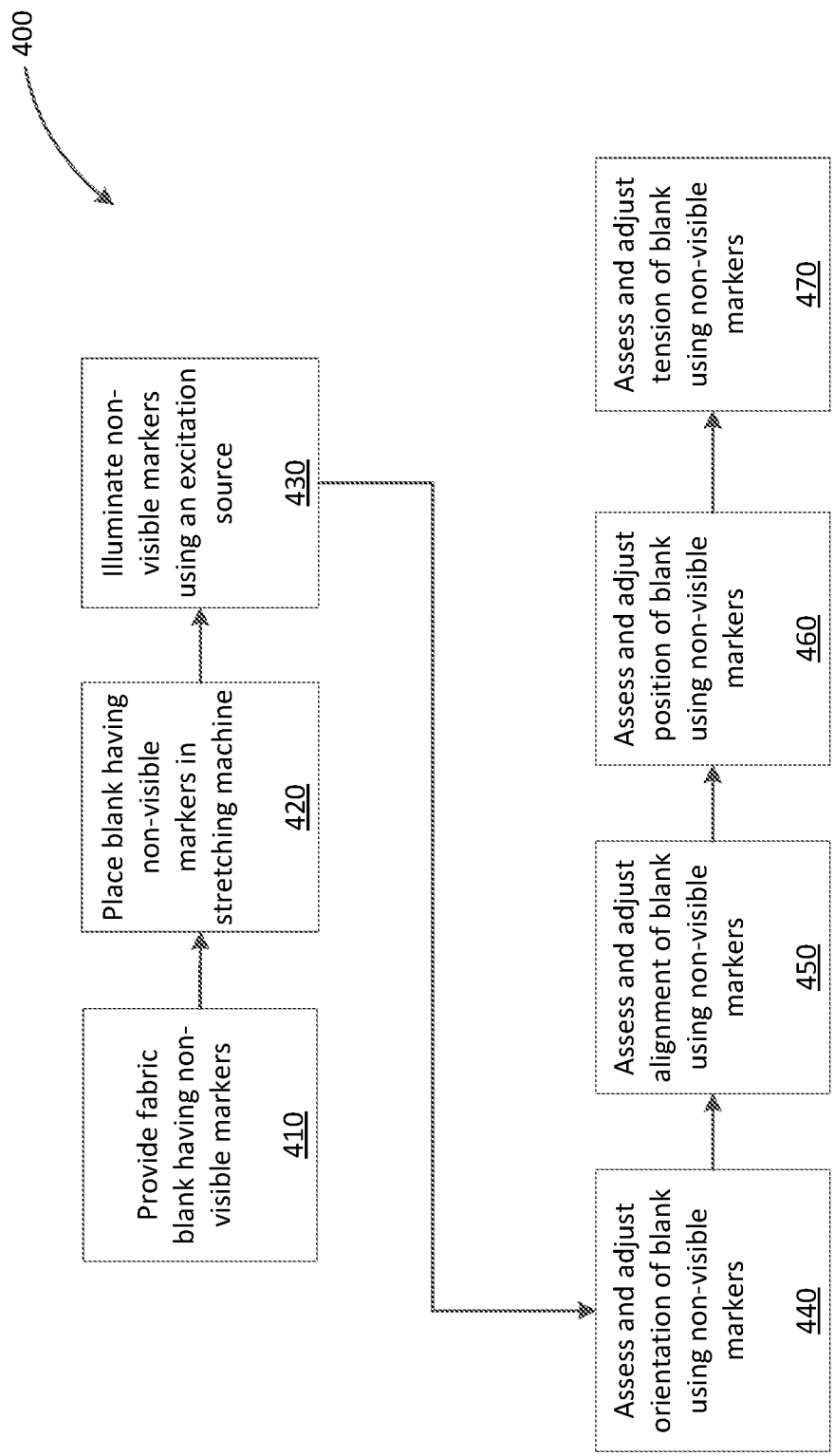
FIG. 14 is another flow chart depicting a method of aligning a blank of suspension material using the stretching machine.

FIG. 14 illustrates another method 400 of manufacturing suspension seating with the suspension members 16, 22 having the non-visible markers 72. First, the method 400 includes providing the fabric blank 64 that includes the non-visible markers (step 410). The non-visible markers 72 can be positioned within the blank 64 in any of the ways described herein to help identify a characteristic of the blank 64. For example, the non-visible marker 72 can be positioned in locations of the blank 64 that can be used to identify the orientation of the blank 64 or the zones 60 within the blank 64. Similarly, the non-visible markers 72 can be positioned on the blank 64 in the manners described above to help measure the tension of the blank 64. Once the blank 64 is prepared with the non-visible markers 72, the blank 64 can be placed in the stretching machine 100 (step 420).

The controller 200 can send a signal to the excitation source 76 to illuminate the non-visible markers 72 so that they can be seen by either a human eye or a sensor 80 (step 430). Once the non-visible markers 72 have been illuminated, the controller 200 can utilize the non-visible markers 72 to assess various characteristics of the blank 64 and make adjustments to achieve the desired characteristics. The blank 64 can be assessed and adjusted according to any of the methods described herein. For example, in one embodiment, the controller 200 can utilize the non-visible markers 72 to assess and adjust the orientation of the blank 64 within the stretching machine 100 so that the blank 64 can be inserted into the carrier 18, 24 according to a desired orientation (step 440). The controller 200 can also use the non-visible markers 72 to assess and adjust the alignment of the blank 64 (step 450). For example, the controller 200 can monitor the non-visible markers 72 to make sure that the non-visible markers 72 are straight, indicating that the surrounding threads are also straight. Similarly, the controller 200 can use the non-visible markers 72 to assess and adjust the position of the blank 64 so that a particular color, pattern, or zone is positioned within the carrier 18, 22 in the desired position (step 460). Furthermore, the controller 200 can use the non-visible markers to measure the tension of the blank 64 as well as align the tension zones 60 in the correct positions within the carrier 18, 24 (step 470). These characteristics of the blank 64 are not necessarily assessed and adjusted according to a specific order. Additionally, in some embodiments, the controller 200 monitors and adjusts multiple characteristic of the blank 64 at the same time.

Due to the independent movement capability of each clamping element 122, in any of embodiment, the blank 64 may be stretched different amounts by each clamping element 122, thereby inducing a different amount of tension to different zones 60 of the blank 64 of suspension member, and thereby making the blank 64 the same, more, or less stiff in each zone 60 relative to other zones 60. When the final stretching of each clamping element 122 is achieved, the first loom member 106 is secured to the second loom member, thereby clamping the blank 64 between the loom members in the desired stretched condition. The clamping elements 122 may then be released, with the loom 104 retaining the blank 64 in the differentially stretched configuration. The loom 104 and stretched blank 64 may then be positioned in a mold tool 186, such that the carrier member 18, 24 may be molded to the blank 64. After the carrier member 18, 24 is molded, the blank 64 may be released from the loom 104, and any excess edge material trimmed from the outside of the carrier member 18, 24. The suspension member 16, 22 is then ready for installation on a seating structure frame 14, 20.

Although the invention has been described in detail with reference to certain preferred embodiments, variations and modifications exist within the scope and spirit of one or more independent aspects of the invention as described. Any of the methods of varying the stiffness or the levels of stiffness discussed herein can be incorporated into any of the other embodiments discussed herein. Various features and advantages of the invention are set forth in the following claims.

What is claimed is:

1. A method of manufacturing suspension seating with a stretching machine, the stretching machine including a support frame and a tensioning mechanism movably coupled to the support frame, the tensioning mechanism having a clamping element and an actuator coupled to the clamping element to move the clamping element, the method comprising:

providing a blank to be used in a suspension member, the blank having a non-visible marker, wherein the non-visible marker is a monofilament fiber having luminescent properties;

gripping a portion of the blank with the clamping element;
illuminating the non-visible marker with an excitation source, wherein the non-visible marker becomes detectable when illuminated by the excitation source;
sensing the non-visible marker with a sensor, the sensor configured to detect the non-visible marker when illuminated by the excitation source;
determining, by a controller, a characteristic of the blank using the non-visible marker, the controller in communication with the sensor and configured to receive information related to the non-visible marker from the sensor;
comparing, by the controller, the characteristic of the blank to a desired characteristic; and
adjusting the blank to achieve the desired characteristic.

2. The method of claim 1, wherein the characteristic includes at least one selected from the group consisting of a position of the blank, a tension of the blank, an alignment of fibers of the blank, and an orientation of the blank.

3. The method of claim 1, wherein adjusting the blank includes aligning the blank using the non-visible marker for guidance.

4. The method of claim 1, wherein adjusting the blank includes stretching the blank with a plurality of tensioning mechanisms.

5. The method of claim 4, wherein each tensioning mechanism includes a clamping element and an actuator coupled to the clamping element to move the clamping element, and further comprising gripping a portion of the blank with each clamping element.

6. The method of claim 5, wherein adjusting the blank includes independently moving the clamping elements of the plurality of tensioning mechanisms by the actuators.

7. The method of claim 1, wherein the blank has a plurality of non-visible markers, wherein adjusting the blank includes creating zones of varying tensions within the blank using the plurality of non-visible markers for guidance.

8. The method of claim 1, further comprising determining, by the controller, tension within the blank by measuring a strain of the non-visible marker based on luminescence of the non-visible marker in response to the excitation source.

9. The method of claim 1, wherein the blank has a plurality of non-visible markers, and further comprising determining tension within the blank by measuring displacement between two of the plurality of non-visible markers.

10. The method of claim 1, wherein illuminating the non-visible marker with the excitation source includes illuminating the non-visible marker with an ultraviolet light, an infrared light, or both.

11. The method of claim 1, wherein sensing the non-visible marker with the sensor includes sensing the non-visible marker with a camera.

12. The method of claim 1, further comprising coupling a carrier of a chair seat or a chair backrest to the blank after the blank is adjusted to achieve the desired characteristic.

13. The method of claim 12, wherein coupling the carrier to the blank includes molding the carrier to the blank.

14. A combination comprising:
a blank having a non-visible marker, wherein the non-visible marker is a monofilament fiber having luminescent properties; and
a stretching machine for creating a suspension member from the blank, the stretching machine comprising:
a support frame;
a tensioning mechanism movably coupled to the support frame, the tensioning mechanism including a clamping element configured to grip a portion of the blank and an actuator coupled to the clamping element to move the clamping element;
an excitation source directed towards the blank and operable to selectively illuminate the non-visible marker in the blank, wherein the non-visible marker becomes visible when illuminated by the excitation source;
a sensor configured to detect the non-visible marker when the non-visible marker is illuminated by the excitation source; and
a controller in operative communication with the sensor and the tensioning mechanism, the controller operable to
determine a characteristic of the blank based on information received from the sensor related to the non-visible marker,
compare the characteristic of the blank to a desired characteristic, and
send instructions to the tensioning mechanism to adjust the blank to achieve the desired characteristic.

15. The combination of claim 14, wherein the characteristic includes at least one selected from the group consisting of a position of the blank, a tension of the blank, an alignment of fibers of the blank, and an orientation of the blank.

16. The combination of claim 14, wherein the stretching machine further comprises a plurality of tensioning mechanisms movably coupled to the support frame, wherein each tensioning mechanism includes a clamping element and an actuator, and wherein the clamping elements of the plurality of tensioning mechanisms are configured to grip different edges of the blank.

17. The combination of claim 16, wherein the clamping elements of the plurality of tensioning mechanisms are independently movable by the actuators.

18. The combination of claim 14, wherein the controller is also operable to determine tension within the blank by measuring a strain of the non-visible marker based on luminescence of the non-visible maker in response to the excitation source.

19. The combination of claim 14, wherein the blank includes a plurality of non-visible markers, and wherein the controller is also operable to determine tension within the blank by measuring displacement between two of the plurality of non-visible markers.

20. The combination of claim 14, wherein the excitation source includes an ultraviolet light, an infrared light, or both.

21. The combination of claim 14, wherein the controller is operable to repeatedly determine the characteristic, compare the characteristic to the desired characteristic, and send instructions to the tensioning mechanism to move the clamping element until the characteristic satisfies the desired characteristic.

22. The combination of claim 14, wherein the tensioning mechanism is a first tensioning mechanism, further comprising a second tensioning mechanism, and wherein the first tensioning mechanism stretches the blank in a first direction and the second tensioning mechanism stretches the blank in a second direction perpendicular to the first direction.

23. The combination of claim 14, wherein the tensioning mechanism stretches the blank in a first direction that is perpendicular to a second direction in which the non-visible marker extends.

24. The combination of claim 14, wherein the blank has a plurality of non-visible markers, and wherein the controller is further operable to:
 monitor a change in distance between two of the plurality of non-visible markers, and
 compare the change in distance to a desired change in distance.

25. The combination of claim 14, wherein the characteristic is an arrangement of a plurality of zones of the blank.

26. The combination of claim 14, wherein the characteristic is a position of a zone on the blank, and wherein the controller is further operable to:
 assess the position of the zone, and
 adjust the blank so the zone is positioned in a desired position.

27. The combination of claim 14, wherein the characteristic is a straightness of the non-visible marker within the support frame, wherein the desired characteristic is a desired straightness of the non-visible marker within the support frame.

28. The combination of claim 14, wherein the blank has a plurality of zones, and wherein the non-visible marker is placed at a transition line between at least two of the plurality of zones.

\* \* \* \* \*